United States Patent
Dabak (10) Patent No.: US 6,480,559 B1
(45) Date of Patent: Nov. 12, 2002

(54) FRAME SYNCHRONIZATION WITH UNIQUE-WORD DEPENDENT FILTER COEFFICIENTS

(75) Inventor: Anand G. Dabak, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/191,096

(22) Filed: Nov. 12, 1998

Related U.S. Application Data (60) Provisional application No. 60/065,575, filed on Nov. 12, 1997, provisional application No. 60/065,603, filed on Nov. 18, 1997, and provisional application No. 60/066,668, filed on Nov. 26, 1997.

(51) Int. Cl.[7] .............................................. H04L 7/00
(52) U.S. Cl. ...................................... 375/368; 370/514
(58) Field of Search ................................ 375/341, 368, 375/354; 370/350, 324

(56) References Cited

U.S. PATENT DOCUMENTS

| | | | | |
|---|---|---|---|---|
| 4,298,987 A | * | 11/1981 | Stattel et al. ................ | 375/106 |
| 4,847,877 A | * | 7/1989 | Besseyre ..................... | 375/368 |
| 5,526,379 A | * | 6/1996 | Kuramatsu ................... | 375/368 |
| 5,774,462 A | * | 6/1998 | Ishikawa et al. ............ | 375/350 |

OTHER PUBLICATIONS

"Communications: The Key to Global Prosperity", IEEE Communications Society, IEE and the UKRI Communications Chapter, IEEE Globecom 1996, Conference Record, vol. 2 of 3, 11/18–22/96, pp. 1015–1019.

* cited by examiner

*Primary Examiner*—Stephen Chin
*Assistant Examiner*—Kevin Kim
(74) *Attorney, Agent, or Firm*—Ronald O. Neerings; Wade James Brady III; Frederick J. Telecky, Jr.

(57) ABSTRACT

A TDMA system in which the mobile receiver performs unique word detection (and hence frame synchronization) by using real correlation coefficients which are not equal to the binary unique word (nor to any shift or scaling of it), but which are dependent on the unique word. In some embodiments, the correlation coefficients are dependent both on the unique word and also on the bit_sync pattern.

29 Claims, 6 Drawing Sheets

FRAME SYNCHRONIZATION WITH UNIQUE-WORD DEPENDENT FILTER COEFFICIENTS

CROSS-REFERENCE TO RELATED APPLICATION

This application claims priority from a provisional application, Ser. No. 60/065,575, filed Nov. 12, 1997, a subsequent provisional application, Ser. No. 60/065,603, filed Nov. 18, 1997, and a second subsequent provisional application, Ser. No. 60/066,668, filed Nov. 26, 1997 all of which are hereby incorporated by reference. However, the content of the present application may not be identical to that of the priority applications.

BACKGROUND AND SUMMARY OF THE INVENTION

The present application relates to frame synchronization architectures and techniques, particularly in time-division-multiple-access ("TDMA") mobile phone systems.

Background: Mobile Communication

Mobile communications are a very important area of the electronics industry, and have become an important part of the lives of most citizens in developed countries. One common mobile communications architecture is cellular phone systems. In such systems a mobile phone will establish communication with a nearby stationary transceiver when it is turned on, and the stationary transceiver station provides a connection into the telephone system. The mobile phone will then switch its communication to other stationary transceivers as a user drives around, so that it is always in touch with some transceiver. Thus each transceiver defines one "cell" of wireless interface. Each stationary transceiver can interface to multiple mobile umts at once, and each mobile unit can transfer to a new transceiver when it gets too far from its previous transceiver.

More recently satellite telephone systems have been proposed. In such systems the mobile units can interface to communications satellites rather than to stationary ground units. In some systems low-Earth-orbit satellites are used, since these are many times closer to the surface than are geosynchronous satellites. However, low-Earth-orbit satellites move around the Earth fairly quickly, so a mobile station must be able to transfer from one satellite to another. Here too one satellite transceiver must be able to interface to many mobile units.

Thus each base transceiver must be able to talk to multiple mobile units. One of the basic techniques is TDMA, as described below. For example, TDMA techniques are used in the Digital European Cordless Telephone ("DECT") system (which is used for mobile telephony in Europe), the Japanese Personal Handy-Phone System ("PHS"), and the MIL-STD-88-183 for UHF satellite systems.

Background: TDMA

One general problem in telecommunications is how to carry multiple signals on one communications channel. TDMA is one of the basic techniques for doing this. (Other quite different ways to do this are frequency division multiple access, or "FDMA," and code division multiple access, or "CDMA"). In TDMA, a transmitter sends out a series of "frames." A frame is a sequence of symbols which contains data for several different destinations, strung together in a definite format. Each receiver can (ideally) pick out just the data it needs, from just one part of the frame.

Background: Frame Synchronization

One requirement of TDMA is that each receiver must know where the frame starts. That is, each receiver must become synchronized to the transmitter. This can be difficult.

More precisely, a receiver must synchronize in three ways:

it must synchronize to the transmitter's carrier wave (in an RF system);

it must synchronize to the transmitter's symbol rate and phase, so that the receiver knows where one symbol starts and another ends; and it must synchronize to the transmitter's frames, so that the receiver knows where one frame starts and another ends.

Each of these synchronizations presents its own difficulties. The present application is particularly directed to the problems of frame synchronization.

Figure 10:
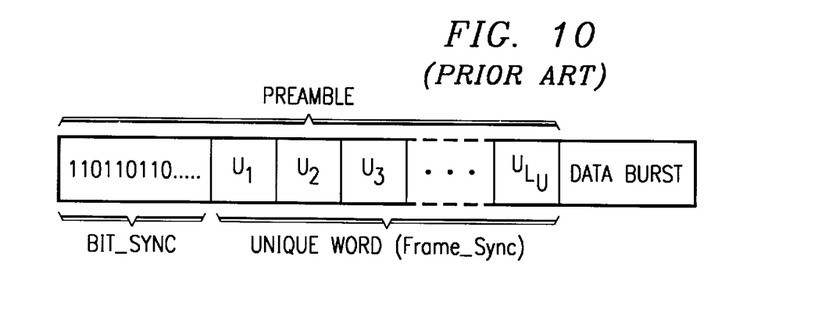
FIG. 10 shows a bit-stream structure of a preamble comprising "frames" of data in a TDMA architecture.

FIG. 10 shows a typical TDMA transmission bit stream. The preamble is comprised of a known series of binary bits, called the bit_sync pattern. These bits permit the receiver to acquire the symbol synchronization, and are followed by a unique word which signals the start of a frame. The unique word is the frame_sync pattern (bits $u_i$).

Note also that, although the bit_sync pattern is fixed, there is an unknown timing offset between the bit_sync pattern and the start of the unique word. Thus, no simple concatenation of the bit_sync pattern with the unique word will accurately represent the incoming signal stream in all cases.

If frame synchronization errors occur, the receiver will not be able to pick out the correct bits in the stream of incoming bits (most of which are meant for other receivers). However, frame synchronization presents some difficulties. The start of a frame is indicated by a special sequence of bits (called the "unique word"), but it is still necessary for a receiver to recognize this unique word in a continuous stream of bits.

Figure 12:
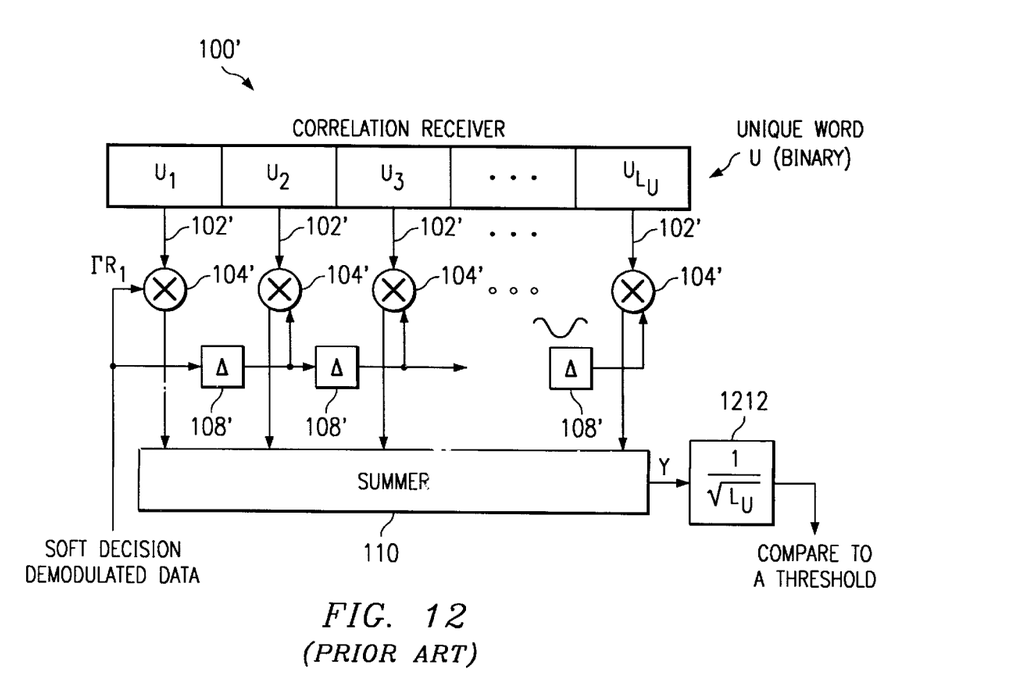
FIG. 12 shows a conventional correlation receiver as conventionally used in a TDMA receiver.

To detect the unique word when it occurs, the receiver typically uses a binary finite-impulse-response ("FIR") filter structure. Conventionally this is operated as a simple correlation detector. As shown in FIG. 12, the filter coefficients are simply the bits $u_i$ of the unique word U itself, which are multiplied with the bits $r_i$ of the data stream. A binary register 100' holds the bits $u_i$ of the unique word, and provides them as outputs on 1-bit lines 102' to the combinatorial stages 104' (which are multipliers in this example, but could also be XOR gates). A series of delay stages 108' clock the input bits $r_i$ through sequentially to the combinatorial stages 104'. The outputs of the combinatorial stages 104' are summed equally by a summer 110, to produce a raw correlation output γ (which can optionally be normalized by a stage 1212, to provide a numerically accurate measure of correlation). The output will reach its highest value when each 1 in the coefficient is multiplied with a 1 in the data stream. In this architecture the receiver concludes that frame synchronization has been achieved when the correlator output crosses a threshold. Alternatively, if a bit rotation (shift) of the unique word is used instead, the correlator would operate with the same performance—no better and no worse—except that a different phase shift would be present at the time when the unique word was detected.

Background: Erroneous Sidelobe Acquisition

Figure 3:
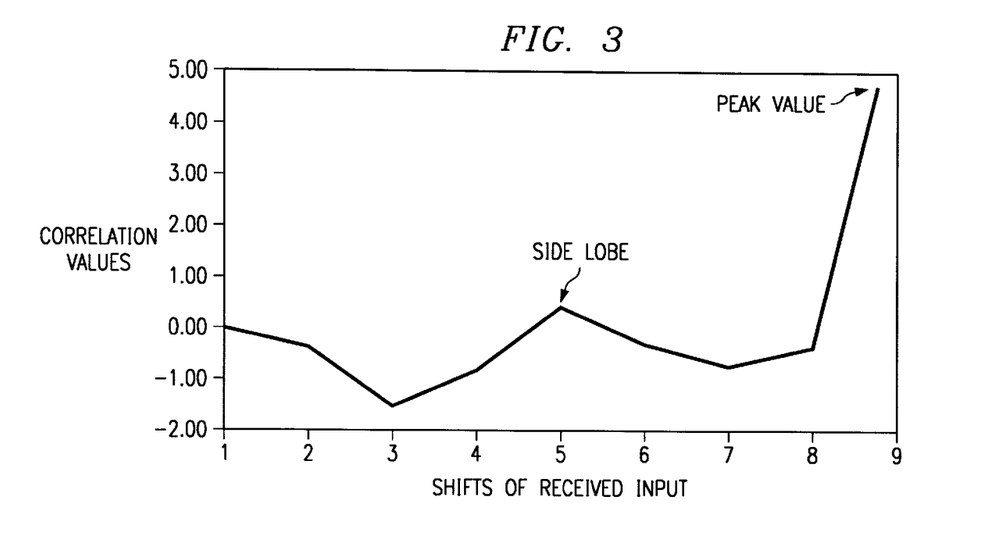
FIG. 3 shows a plot of the correlation values for a conventional correlation receiver for a unique word of, length 24, assuming that a maximum of 8 bits precede the frame sync ($L_b$=8).

FIG. 3 shows a plot of the correlation values for a conventional correlation receiver for a unique word of length 24, assuming that a maximum of 8 bits precede the frame sync ($L_b$=8). The variation in correlations as the different phases of the correlation vector are tried can produce "sidelobes," i.e. spurious local maxima in the correlator output. Such a sidelobe occurs, in this example, at a shift of five units. In conventional systems, such a sidelobe can cause a false detection of frame synchronization, and this can lead to an attempt to lock onto an incorrect frame synchronization value. (The high value at shift 9 shows the correct acquisition of frame synchronization.)

In terms of the system context, a false acquisition of a sidelobe peak can mean complete loss of synchronization between the mobile unit and the system. This will require reacquisition of correct timing from scratch. This can take seconds in some systems. Thus, in a cell phone context, this may result in a noise burst, or in complete loss of a call.

Frame Synchronization with Unique-Word-Dependent Coefficients

The present application discloses that unique word detection (and hence frame synchronization) can be improved by using a correlation coefficient vector which is not equal to the unique word (nor to any shift or multiple of it), but which is dependent on the unique word. In some embodiments, the correlation coefficients are dependent both on the unique word and also on the bit_sync pattern. Preferably the coefficient vector is optimized by picking it to be "near" a set of error offset vectors (using a special minimax metric), to maximally distinguish the unique word from the erroneous candidates. The error offset vectors are derived from a set of erroneous candidate vectors which are all of the same length as the unique word, and which are found within the concatenation of the unique word with the bit_sync pattern.

The disclosed optimal linear receiver provides better sidelobe suppression than the conventional correlation operation. The advantageous result is to decrease the potential for a false detection of the sidelobe thereby increasing the potential for detecting only the desired peak value. Another advantage is easy implementation, since the existing systems can be upgraded simply by a change in correlation coefficients in the receiver. Another advantage is that irrespective of the length of the sequence, the innovative receiver always yields gain over the conventional correlation receiver. Another advantage is that the innovative method achieves far greater gain for shorter length sequences. Another advantage is that joint optimization of the unique word and the linear receiver will achieve even better synchronization performance.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Further Background and Definitions

Further discussion of synchronous communications can be found in the following papers: Dabak, "Optimum Linear Receiver for Frame Synchronization in TDMA, Modulation, Coding, and Synchronization," Globecom '96; Dabak, "Optimum Linear Receivers for Synchronizing Pseudo Random Sequences," in Proceedings of the IEEE International Symposium on Information Theory (1995); R. H. Barker, Group Synchronization of Binary Digital Systems (1953); James L. Massey, Optimum Frame Synchronization, IEEE Transactions on Communications (1972); and J. J. Stiffler, Theory of Synchronous Communications (1971); all which are hereby incorporated by reference.

Overview

Figure 1:
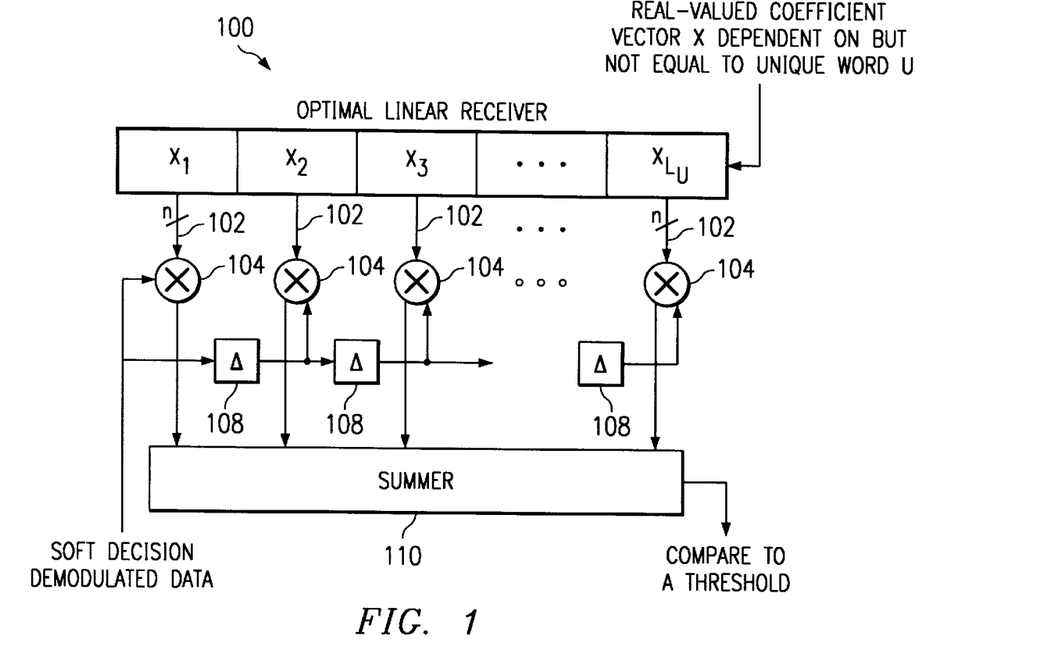
FIG. 1 schematically shows the innovative architecture for detection of frame synchronization, wherein the incoming bits are digitally filtered using coefficients which are derived from, but not equal to, the particular unique word being used.

FIG. 1 shows the innovative frame synchronization architecture. FIG. 1, like FIG. 12, uses a finite-impulse-response ("FIR") filter structure, but there is a very important difference between FIGS. 1 and 12: FIG. 12 is a simple binary filter, whereas FIG. 1 uses real numbers (or at least numbers which are quantized to more than 1 bit of resolution).

Thus in FIG. 1 the register 100 (unlike the register 100' of FIG. 12) provides an n-bit output (n>1) on each coefficient output 102. The multipliers 104 must multiply the data stream inputs with n-bit coefficient values $x_i$ rather than binary values $u_i$. The input data stream can optionally be m bits wide rather than binary, and in this case the delay stages 108 must be m bits wide. The outputs of the combinatorial stages 104' are summed by a summer 110, to produce a linear receiver output $\gamma^L$ The output will reach its highest value when each 1 in the data stream is multiplied with a relatively high value in the coefficient vector. In this architecture the receiver concludes that frame synchronization has been achieved when the receiver output crosses a threshold.

Thus in FIG. 1 the filter coefficients are not equal to the unique word (nor to any shift or multiple of it), but are dependent both on the unique word and also dependent on the bit_sync pattern.

Detailed Discussion

In the following discussion, the following notation will be used:

The vector U is the unique word.

The vector B is the longest possible sequence of bit_sync bits remaining when the receiver starts looking for the unique word.

The vector C is the concatenation of the vectors U and B. i.e. all the elements of B followed by all the elements of U.

X is a vector of filter coefficients, which is used in a filter structure to recognize the unique word in the incoming bit stream.

The present application presents an optimized procedure which generates an approximately optimal correlation vector $X_{opt}$ for any given unique word vector U.

The set of erroneous candidate vectors $S^i$ includes subsequences (each of the same length as the unique word) which are extracted from the concatenation of the unique word with the bit_sync pattern. (Since U is excluded from this set, all of the vectors $S^i$ are erroneous.)

The set of error offset vectors $V^i$ shows the difference from U of each vector $S^i$. The present application teaches that a non-binary optimized coefficient vector $X_{opt}$, can be derived from these error offset vectors $V^i$, using a special max/min relation to ensure that $X_{opt}$ is "near" the set of $V^i$.

The vectors $N^i$ represent the additive noise which will appear on the input. Thus the received sequences will not be exactly equal to the vectors $S^i$, but may instead be written as vectors $R^i = S^i + N^i$.

The probability of miss (i.e. of not recognizing the unique word when it comes by in the received sequence) will be written as $P_m$. The probability of a false alarm (i.e. of incorrectly recognizing a received vector $R^i$ as the unique word) will be written as $p^i_f$.

Hypothesis Testing

As mentioned before, it is assumed that the receiver has achieved carrier phase and symbol timing, and there is an unknown amount of the periodic 1-0 pattern in bit_sync before the arrival of frame_sync. Let $L_b$ stand for the maximum number of bit_sync bits remaining when the receiver starts looking for the unique word. Let the vector $$B = \{b_1, b_2, \ldots b_{L_b}\}$$

denote these remaining bits. The length $L_b$ is determined by the acquisition time for acquiring the bit symbol timing from bit_sync. Let $L_u$ denote the length of the unique word. Let $$C = \{c_1, c_2, \ldots, c_{L_b + L_u}\} = \{b_1, b_2, \ldots, b_{L_b}, u_1, u_2, \ldots u_{L_u}\}$$

denote the concatenation of sequences B and U. Now consider the set of sequences $S^i$ where $$S^i = \{c_i, c_{i+1}, \ldots, c_{i+L_u-1}\}; i=1, \ldots, L_b+1.$$

For simplicity of analysis, assume that the possible phase ambiguity of 180 degrees in phase-shift-keyed systems does not occur. (The case when this does occur is easily met by an alternative embodiment described below.)

The presently preferred embodiment uses a min/max optimization, in which the peak likelihood of false synchronization detection is the value which is minimized. It would be more theoretically ideal to minimize the union bound value $p_f$ of the net probability of false alarm:

$$p_f \leq \sum_{i=1}^{i=L_b} p_f^i \quad (4)$$

Instead, the present application teaches that a useful simplification is to use the maximum value of $p^i_f$ for optimization. Letting α be the maximum allowable probability of miss, the problem of frame synchronization can then be stated as:

$$\min_{\forall \gamma} \max_{i=1,2,\ldots,L_b} p_i^f; \quad p_m \leq \alpha \quad (5)$$

We thus try to find that detector which minimizes the maximum probability of false alarm, while achieving a certain probability of miss. Even though this problem looks like a standard robust detection problem, a closer look shows that it does not fit in the class of any of the standard robust detection problems.

The Linear Receiver

The optimization problem presented in the preceding equation is difficult, but it becomes simpler when the detector γ is required to be linear. Let $\gamma^L$ denote a linear detector. Consider a normalized real-valued sequence $$X = \left\{ x_1, x_2, \ldots, x_{L_u}; \quad x_i \in \mathbb{R}, \sum_{i=1}^{L_u} x_i^2 = 1 \right\}$$

and consider the linear receiver $$\gamma^L = \sum_{i=1}^{i=L_u} x_i r_i = \langle R, X \rangle.$$

(As this equation shows, the angle brackets denote the inner product of two vectors.) Using this receiver, the occurrence of the unique word is declared when $\gamma^L$ exceeds a threshold η. Letting $$x_i = \frac{u_i}{\sqrt{L_u}}$$

in equation (5) yields the correlation receiver (FIG. 12). Since the correlation receiver is also an element of the set of receivers being considered for optimization, using the optimal linear receiver will always yield an improvement over the correlation receiver. For a threshold η and the above given linear detector, the probabilities of miss and false alarm can now be calculated. Since a goal is to minimize the maximum false alarm probability, this will occur in equation (3) when $p_m = \alpha$. A near match is said to have occurred, whenever the correlation receiver output $\gamma^L$ crosses the thresholds η.

The optimization in equation (3) may now be restated as: The quantity $\langle V^i, X \rangle$ is the projection of the vector $V^i$ onto the vector $$\max_{X \in R^{L_u}} \min_{i=1,2,\ldots,L_b} \langle \underline{U} - \underline{S}^i, X \rangle; \quad \|X\| = 1. \tag{6}$$

X. Geometrically, equation (6) finds the real-valued unit vector X, which lies within the space spanned by the collection of vectors $V^i$, such that the minimum of the projections of the vectors $V^i$ onto X is maximized.

Figure 2:
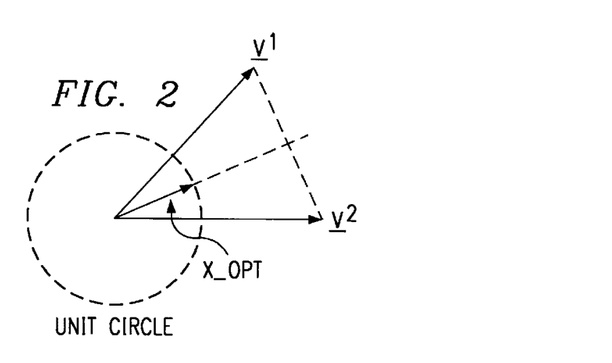
FIG. 2 shows the optimal unit vector maximizing the minimum projection for the case of two vectors.

A simplified geometric example may help to illustrate this. For simplicity, consider the case where the number of bits preceding the frame_sync is two ($L_b=2$) (implying only two vectors $v^1$ and $v^2$). FIG. 2 shows the optimal unit vector maximizing the minimum projection for the case of two vectors. Ultimately, when solving equation (6), the optimal vector $x_{opt}$ will lie on the intersection of the unit ball and the plane defined by vectors $v^1$ and $v^2$. Depending on the relative projections of the two vectors, the solution lies either on one of the two vectors, $v^1$ or $v^2$, or somewhere in between.

The following discussion will show how to actually obtain an optimized coefficient vector $X_{opt}$ for any given unique word U.

The Optimal Linear Receiver

The present application shows how to obtain an optimized coefficient vector. There exists a vector $\tilde{X}$ which has the following properties:

1. It is a linear combination of the vectors $V^i$, i.e.

$$\tilde{X} = \sum_{i=1}^{L_b} \beta^i \underline{V}^i \tag{8}$$

2. It lies within the cone of the vectors $V^i$. This implies that the coefficients $\beta^i$ all lie between 0 and 1 inclusive, and $$\sum_{i=1}^{L_b} \beta^i = 1. \tag{9}$$

3. Let each nonzero $\beta^i$ be denoted by a variable $\beta^l$. The collection $\{\beta^l; l=1, \ldots m\}$, $m \leq L_b$ thus denotes the set of all the non-zero values. Let $\beta^i$ represent the vector $\tilde{S}^1$ represents the vector $S^i$ corresponding to $\beta^l$. Writing U-$\tilde{S}^1$ as the vector $\tilde{V}^1$, it may be seen that the vectors $\{\tilde{V}^1; l=1, \ldots m\}$ are linearly independent.

4. Finally, let $\epsilon = \min_{i=1,\ldots,L_b} \langle V^i, \tilde{X} \rangle$ then for all l $$\langle \tilde{V}^1, \tilde{X} \rangle = \epsilon. \tag{10}$$

The unit vector $$X_{opt} = \frac{\tilde{X}}{\|\tilde{X}\|}$$

uniquely solves these conditions.

The crux of finding the optimal coefficient vector for a given problem is finding the collection of vectors $\tilde{S}^1$. Having found this collection, the coefficients $\beta^l$ can be obtained by solving the set of simultaneous equations. Since all of the vectors $\tilde{V}^1$ are linearly independent, there are exactly (m+1) linearly independent equations, and (m+1) unknowns.

The following procedure will identify the unique set $\{\tilde{S}^1\}$. This procedure initially picks the vectors with maximum off-peak correlation as elements of this set and solves for $\beta_l$. If this set satisfies all the conditions in the proposition, then by uniqueness of the solution, the procedure has converged to a solution. If not, the procedure adds the next off-peak correlation vectors to the set and continues.

Generation of Unique-Word-Dependent Filter Coefficients

The following Matlab program provides a simple procedure to derive the optimal filter coefficients for a given unique word. Of course this program does not delimit the scope of the claims, but is provided merely to illustrate the implementation of the presently preferred best mode.

```
%This code solves for the vector for:
% 1) The number of the Gold sequence we are solving
% 2) The time shifts which are to be taken as vectors.
clear gold;
clear dim;
clear time;
k=size(uw,2);
kk=size(x,2)-size(uw,2);
dim=input('The number of vectors you want to solve this
    for');
for i=1:dim;
    time(i)=input('The next number of the vector you want to
        solve this for');
    sgn(i)=input('Sign of vector to suppress 1=+ve lobe,
        -1=-ve lobe');
end
% Finished taking the input of all vectors
% start generating the circular shifts of sequence Gold clear
    u;
clear sig;
clear s;
sig=uw;
for i=1:kk+1;
    s(i,1:k)=x(i:i+k-1);
end
% Finished generating the shifts of Legendre polynomials
% Now generate the vectors for which we want to solve.
clear row_temp;
clear sig_min_s;
clear s_min_dim;
row_temp=time(dim);
sig_min_s(dim, 1:k)=sig-sgn(dim)*s(row_temp, 1:k);
for i=1:dim-1;
    row_temp=time(i);
    sig_min_s(i, 1:k)=sig-sgn(i)*s(row_temp, 1:k);
    s_min_dim(i, 1:k)=sig_min_s(i, 1:k)-sig_min_s (dim,
        1:k)
end
% Finished generating the vectors for which we want to
    solve.
clear A;
clear B;
for j=1:dim-1;
    for i=1:dim-1;
        A(j,i)=s_min_dim(i,1:k)*s_min_dim(j,1:k)';
    end
    B(j,1)=-(sig_min_s(dim,1:k)*s_min_dim(j,1:k)');
end
clear T;
T=inv(A)*B;
dummy sum(T);
T(dim)=1-dummy;
clear solution;
solution(k)=0;
for i=1:dim;
    solution=solution+T(i)*sig_min_s(i,1:k);
end
``` solution=solution/norm(solution);
inner-prod=s*solution';
inner_prod'
old_inner=s*sig'/norm (sig);

Examples of the Optimal Linear Receiver

The practical implementation of the optimal linear receiver is not. As mentioned before, a nominal change of filter coefficients in the correlation receiver (once the correct coefficient vector has been found) is all that is required to implement the new receiver.

Figure 5:
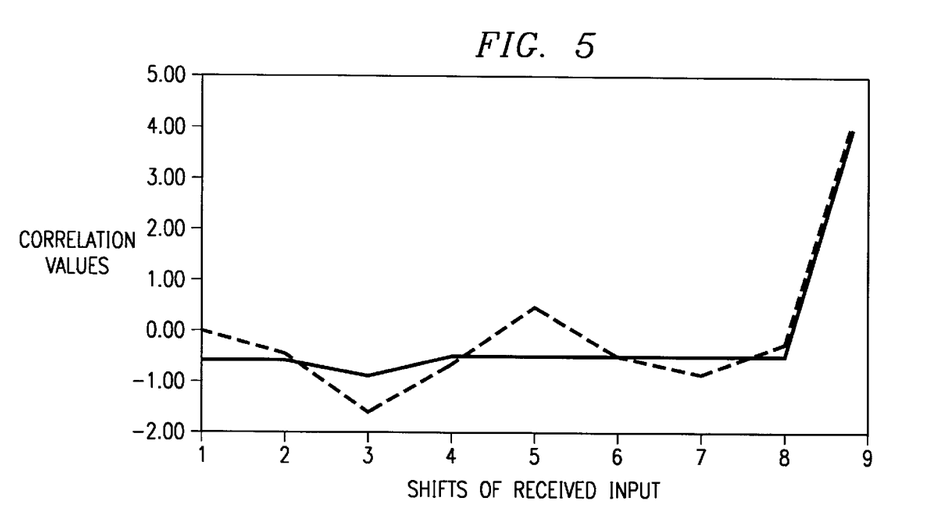
FIG. 5 shows a comparison of the new optimal receiver correlation values with the correlation values of the correlation receiver (FIG. 3) for a unique word of length 24.

In a first example, consider the unique word d46e1b of length 24. Assume that the bit_sync consists of a 1100 pattern and $L_b=8$ that is a maximum of 8 bits are left after recovering the symbol timing. Hence, there is a possible 1100 1100 bit_sync pattern (or parts of it) remaining before the arrival of the unique word 1101 0100 0110 1110 0001 1011. Thus, $S^1$ = 1100 1100 1101 0100 0110 1110,
$S^2$ = 1001 1001 1010 1000 1101 1100,
$S^3$ = 0011 0011 0101 0001 1011 1000,
$S^4$ = 0110 0110 1010 0011 0111 0000,
$S^5$ = 1100 1101 0100 0110 1110 0001,
$S^6$ = 1001 1010 1000 1101 1100 0011,
$S^7$ = 0011 0101 0001 1011 1000 0110,
$S^8$ = 0110 1010 0011 0111 0000 1101,
$S^9 = U$ = 1101 0100 0110 1110 0001 1011, Considering the 0 to be a −1, and using the conventional correlation receiver (with a coefficient vector of U/‖U‖, FIG. 3 shows the correlator outputs for 9 successive input samples. The continuous line in FIG. 5 shows how this result is improved when the optimal coefficient vector Xopt is used instead. By comparing the continuous and dotted lines of FIG. 5, it can be seen that the sidelobes in FIG. 3 have been squashed down. This improves the synchronization performance of the receiver. The minimum peak-to-sidelobe distance of 4.4908 (dotted line) for the correlation receiver is increased to 5.2918 in the case of the optimal linear receiver (solid line). Hence the signal-to-noise ratio gain is approximately 20 log (5.2918/4.4908)=1.4255 dB.

To solve for the optimal linear receiver, first pick the possible set of the vectors $\tilde{S}^1$ corresponding to i=2, 5, 6, 8 and solve for $\beta^1$. Going through this procedure iteratively, we finally find that the set corresponding to i=1, 2, 4, 5, 6, 7, 8 satisfies all of the conditions.

Figure 4:
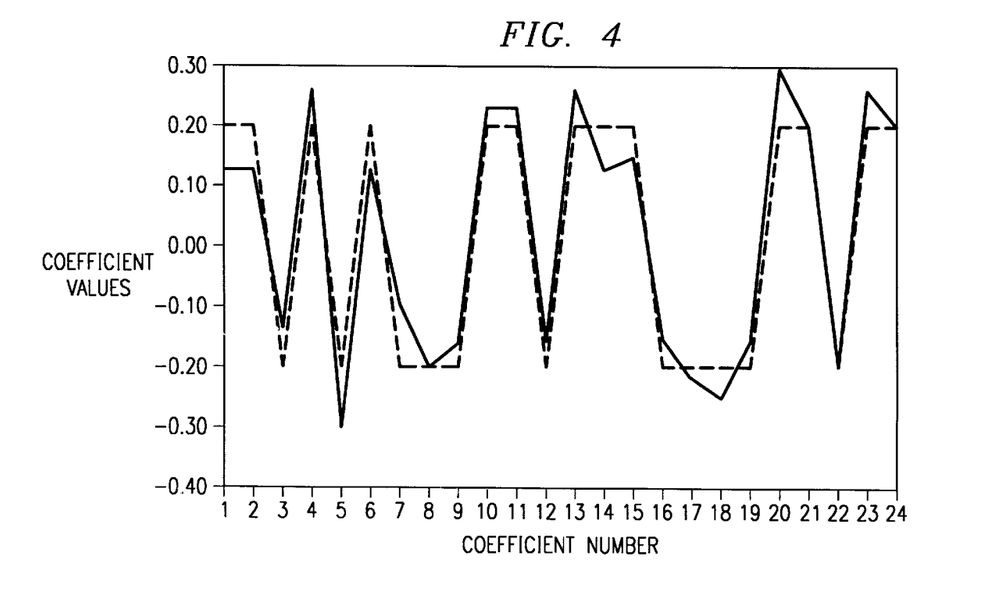
FIG. 4 shows a comparison of the correlation receiver filter coefficients and the optimal linear receiver filter coefficients for a unique word of length 24.

FIG. 4 shows a comparison of the correlation receiver filter coefficients and the optimal linear receiver filter coefficients for a unique word of length 24. The dotted line indicates the conventional correlation receiver coefficients (scaled to fit a range between 0.2 and −0.2), and the solid line indicates the optimal receiver coefficients. Note that the numerical difference in coefficient values between the old and new receivers is fairly small, but this corresponds to significantly improved performance.

FIG. 5 shows a comparison between the correlation values $<X_{opt}, S^1>$ obtained with the new optimal receiver, and the correlation values obtained with the conventional correlation receiver (FIGS. 12 and 3) for a unique word of length 24.

Figure 6:
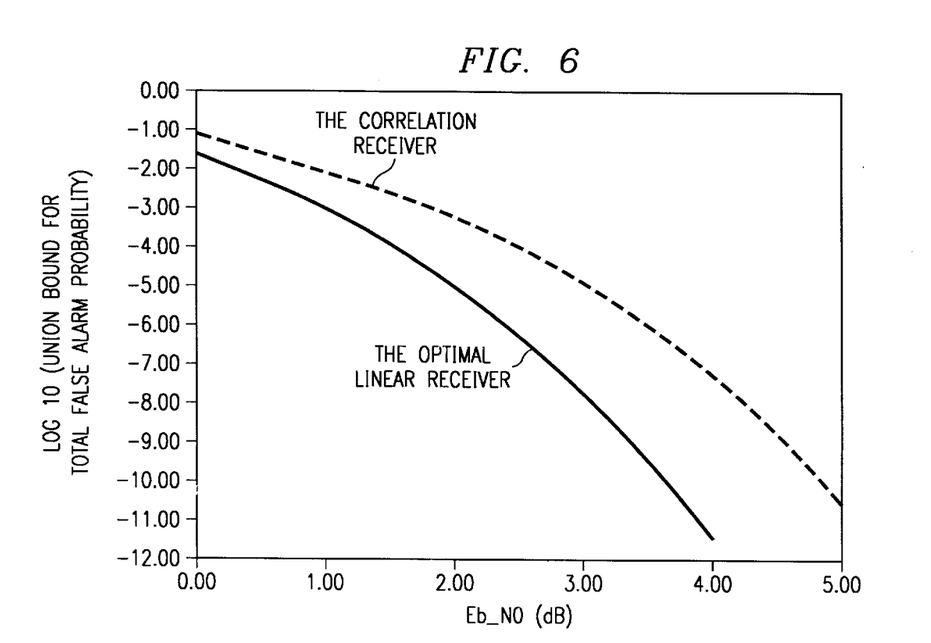
FIG. 6 compares the total probability of false alarms between the conventional correlation receiver and the optimal linear receiver.

To confirm the synchronization performance improvement, FIG. 6 shows a plot of the log 10 of the union bound data for the total probability of false alarm of the correlation receiver (dotted line) and the optimal linear receiver (solid line), as function of the signal-to-noise ratio, $E_b/N_0$. The probability of miss $p_m$ is held fixed at $10^{-6}$. It can be seen in FIG. 6 that at a high $E_b/N_0$, the improvement provided by the optimal linear receiver over the correlation receiver is approximately 1.3 dB. It is a little less than that predicted in FIG. 5 because the number of maximum off-peak correlations for optimal linear receiver are more (seven corresponding to i=1,2,4,5,6,7,8 in FIG. 5) as opposed to only one (corresponding to i=5) maximum off-peak correlation for the correlation receiver.

In a second example, consider the unique word 6B899AF0 of length 32 used in a PHS system, preceded by a length 62 periodic pattern 1-0-0-1 bits. $L_b$ is assumed to be equal to 32 bits (that is, the symbol timing recovery requires a minimum of 30 bits). Again, writing out all the $S^i$ vectors for i=1, . . . $L_b$+1, and going through an optimization procedure similar to that which was used in the first example, yields the set $\tilde{S}^1$ corresponding to i=2, 6, 13, 14, 15, 16, 20, 24.

Figure 7:
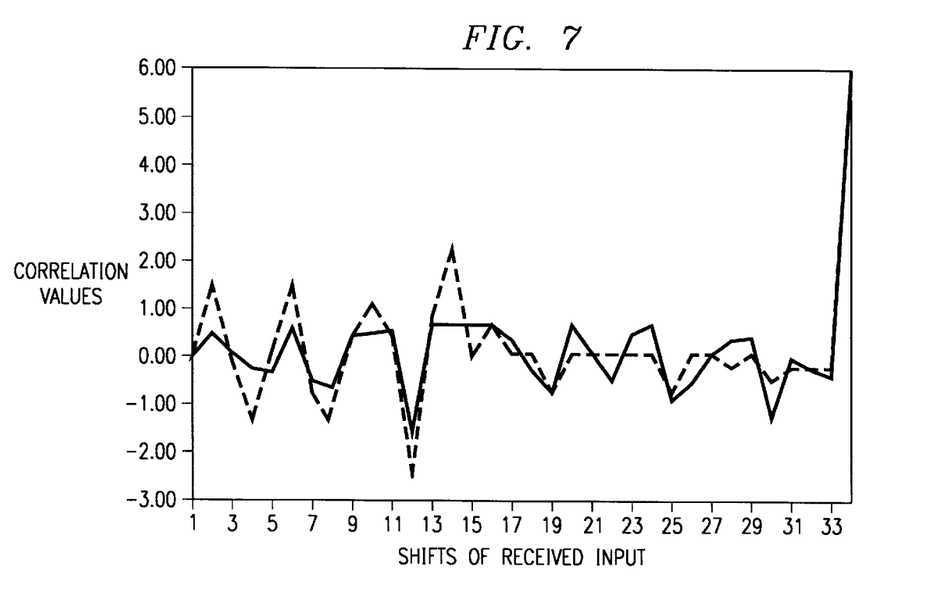
FIG. 7 shows a comparison of the correlation values for the optimal linear receiver and the correlation values of the correlation receiver for the frame synchronization of PHS-based systems.

FIG. 7 shows a comparison of the correlation values for the optimal linear receiver (solid line) and the correlation values of the correlation receiver (dotted line) for the frame synchronization of PHS-based systems. The minimum peak-to-sidelobe distance of 3.5356 for the correlation receiver is increased to 4.6935 in the case of the optimal linear receiver. Hence the signal-to-noise ratio gain in frame synchronization is approximately 20 log (4.6935/3.5356)=2.46 dB. Again, a significant improvement in minimizing the sidelobe peaks is noted.

Figure 8:
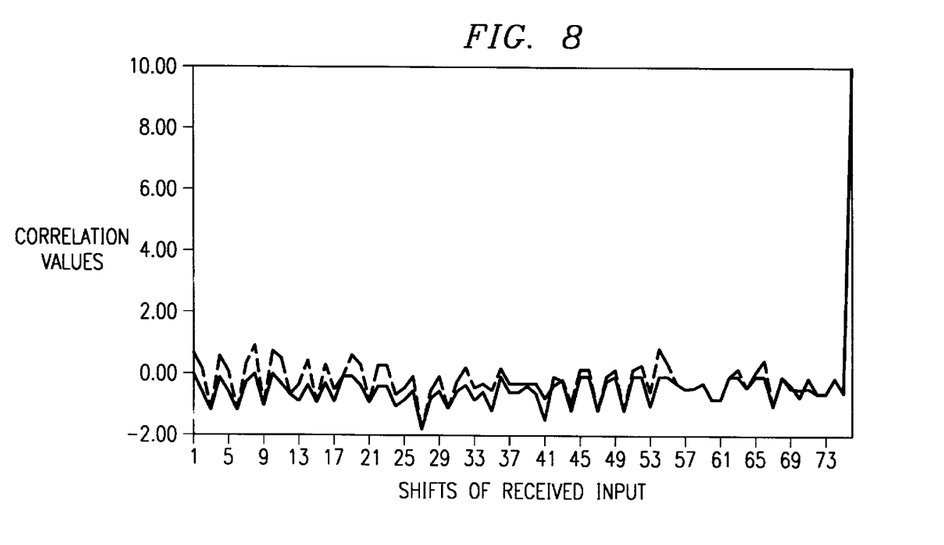
FIG. 8 shows a comparison of the correlation values for the optimal linear receiver with the correlation values of the correlation receiver for the frame synchronization of MIL-STD-188-183-based systems.

In a third example, consider the length 74 unique word bit pattern in MIL-STD-188-183 standard, with the first 72 bits given by 8B84F2171A26BDEB22 followed by two bits 11. The data is binary phase-shift-keyed ("BPSK") modulated. The unique word is preceded by 114 bits of the periodic 1-1-0 bit_sync pattern. We assume $L_b$ to be equal to 75 bits (that is, symbol timing recovery requires a minimum of 39 bits). Again writing out all the $S^i$ vectors for i=1, . . . $L_b$+1, and going through an optimization procedure similar to the first example yields the set $\tilde{S}^1$ corresponding to i=1, 8, 10, 18, 19, 36, 45, 51, 52, 54, 55, 62, 63, 65, 66, 68, 71, 74. FIG. 8 shows a plot of the comparison of the correlation values for the optimal linear receiver with the correlation values of the correlation receiver for the frame synchronization of MIL-STD-188-183-based systems. The minimum peak-to-sidelobe distance of 7.6723 for the correlation receiver is increased to 8.2298 in the case of the optimal linear receiver. Hence the signal-to-noise ratio gain in frame synchronization is improved by approximately 20 log (8.2298/7.6723)= 0.6093 dB. The unique word employed is much longer than in the prior examples. Hence, the optimal linear receiver gain is smaller.

In a fourth example, consider E98A, a length 16 unique word used in the DECT standard. The unique word is preceded by 16 bits of the periodic 1-0 bit_sync pattern. We assume $L_b$ equal to 8 bits (that is, symbol timing recovery requires a minimum of 8 bits). Again writing out all the $S^i$ vectors for i=1, . . . $L_b$+1 and going through an optimization procedure similar to that in the first example yields the set $\tilde{S}^1$ corresponding to i=1,2,3,5. Recall that the above optimal linear receiver assumes that no 180 degrees phase ambiguity can occur in phase synchronization.

Now consider the case when there could be a 180 degrees phase ambiguity. In this case, not only is it desirable to suppress the sidelobes, but due to the phase ambiguity, it is also preferable to suppress the inversion of the sidelobes.

Figure 9:
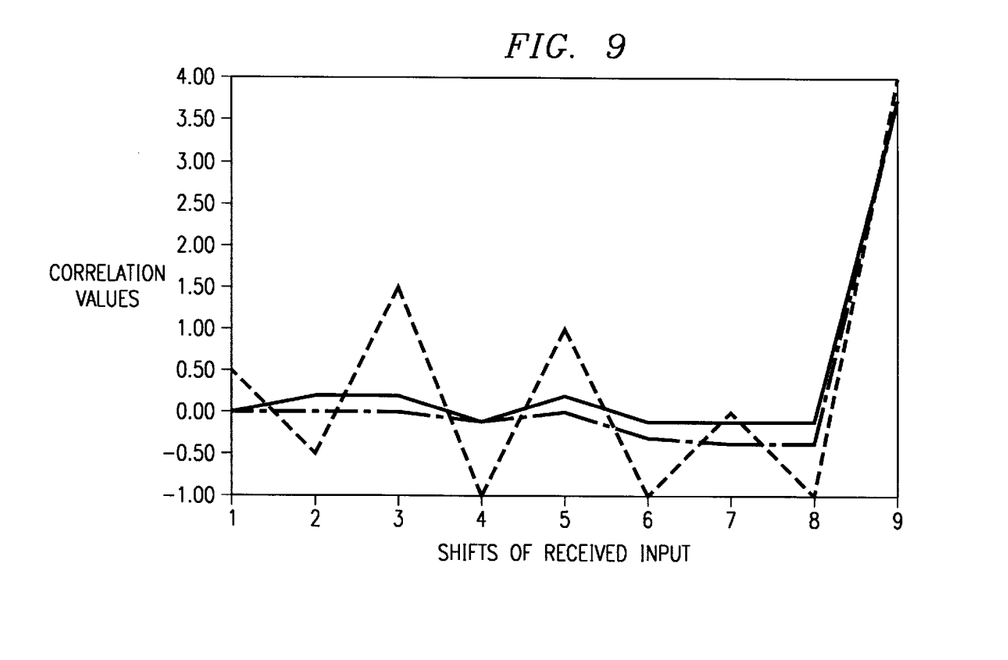
FIG. 9 shows a comparison of the correlation values for an optimal linear receiver, with and without the 180 degrees phase ambiguity, with the correlation values of the correlation receiver for DECT-based systems.

Having formulated the problem this way, one can go through the same procedure and solve for the optimal linear receiver which accounts for the 180 degrees ambiguity. FIG. 9 shows a comparison of the correlation values for an optimal linear receiver, with and without the 180 degrees phase ambiguity, with the correlation values of the correlation receiver for DECT-based systems. The optimal linear receiver, not accounting for the 180 degrees phase ambiguity (the light line), has bigger negative lobes than positive ones. Hence, it yields a gain of approximately 3.06 dB over the correlation receiver, in absence of phase ambiguity, and approximately 1.84 dB in its presence. The dark line in the FIG. 9 shows the correlation values for the optimal linear receiver designed for the presence of 180 degrees ambiguity. Notice that the positive and negative sidelobes are equal and it gives a gain of approximately 2.84 dB over the correlation receiver, in the presence or absence of phase ambiguity. As a final comment, in the presence of phase ambiguity, the receiver designed for its presence out performs the one which has not been designed for the ambiguity. Similarly, a receiver designed to operate in the absence of a phase ambiguity out performs a receiver which has not been designed for its absence.

Discussion

The optimal linear receiver for frame synchronization indeed yields substantial signal-to-noise ratio gain over the correlation receiver.

One of the issues while solving for the optimal linear receiver is the choice of the parameter $L_b$ and how it affects the optimal linear receiver. Note that $L_b$ could always be selected to be the length of bit_sync and solved for the optimal linear receiver. However, such a case will not occur in practice since some bits of the bit_sync will be used to recover the symbol timing. In the prior first, second, and fourth examples, $L_b$ was selected to be about half the size of bit_sync, and in the third example, it is more than half. As can be seen from the four examples, substantial gain in frame synchronization is achieved, irrespective of whether $L_b$ is chosen to be smaller or larger than bit_sync.

Thus, these results show greatly improved performance over the prior art teachings. Under the various conditions tested, the improved receiver was shown to provide improved sidelobe suppression, as compared with conventional receivers, by signal-to-noise ratios of 1.5, 2.4, 3.07, and 0.6 dB for selected words used in practice.

In the presently preferred embodiment, each symbol encodes 2 bits of information. However, the symbol resolution can be higher or lower, i.e., binary or 16-ary as well as quaternary.

In a sample embodiment, the carrier frequency might be in the neighborhood of two gigahertz, and the symbol rate either 192,000 symbols per second or 384 symbols per second, depending on the protocol used. The symbols would each encode two bits per symbol. The frame rate would typically be in the neighborhood of 1,000 frames per second. The preamble information described above would usually be transmitted on a control channel, while the data would be transmitted on a data channel. (The control channel and data channel are themselves usually related by a TDMA allocation.)

In a sample embodiment, the unique word would typically be 32 symbols (e.g., 64 bits), but of course this can be varied. However, it should be noted that the disclosed innovations are most advantageous when the unique word is 128 bits or less. (With longer unique words, the sidelobes of the correlation process are less conspicuous.)

Alternative Embodiment with Detection of Carrier Phase Reversal

The results shown in FIG. 9 for the DECT standard show a further use of the unique word. In some implementations of the carrier synchronization circuitry, it is possible for the synchronization for the carrier to be off by 180 degrees. (That is, the timings of the zero crossings of the carrier are correctly identified, but the positive and negative signs are not correctly identified.) If this happens, the entire bit pattern would be reversed (ones and zeros would be exchanged).

This figure shows how the innovative receiver was tested both with and without a possible 180 degree preceding phase error. As these results show, the innovative receiver performed vastly better than the prior art receiver, even in the presence of such carrier phase inversions.

The method of deriving the optimal coefficient vector is slightly different in this embodiment. In this embodiment, unlike the first embodiment described above, the erroneous candidate vectors which have negative values must be considered, as well as those which have positive values. Thus, in this alternative embodiment a larger set of erroneous candidate vectors $S^i$ is used in the optimization described above. This means that the optimization is slightly slower, but where this functional capability is needed, this embodiment provides further significant advantages.

Alternative Embodiment with Optimally Selected Unique Word

In a further class of embodiments, various unique words are used as inputs to the correlation coefficient optimization process described above, and the performance of the derived optimized coefficients are then tested with that particular unique word. As the foregoing examples show, different unique words can yield different figures of merit for sidelobe suppression. Thus, by testing a set of candidates of unique word, with candidates for the unique word, together with the coefficient vector which is derived for each. of the unique words, an optimal unique word can be detected. It should be noted that the article by Sheen and Shih, entitled "On the Performance Evaluation, Selection, and Decision of Unique-Words for Timed-Division Multiple Access," 44 IEEE Transactions on Vehicular Technology 121 (1995) attempts to do some optimization of unique words, and which is hereby incorporated by reference. However, since this paper merely used a standard receiver (with coefficients which were not optimally derived from the unique word, but which were simply equal to the unique word itself), this did not achieve results anywhere close to as good as those predicted to be achieved by this class of embodiments.

Sample Hardware Cellular Telephone Implementation

Figure 11:
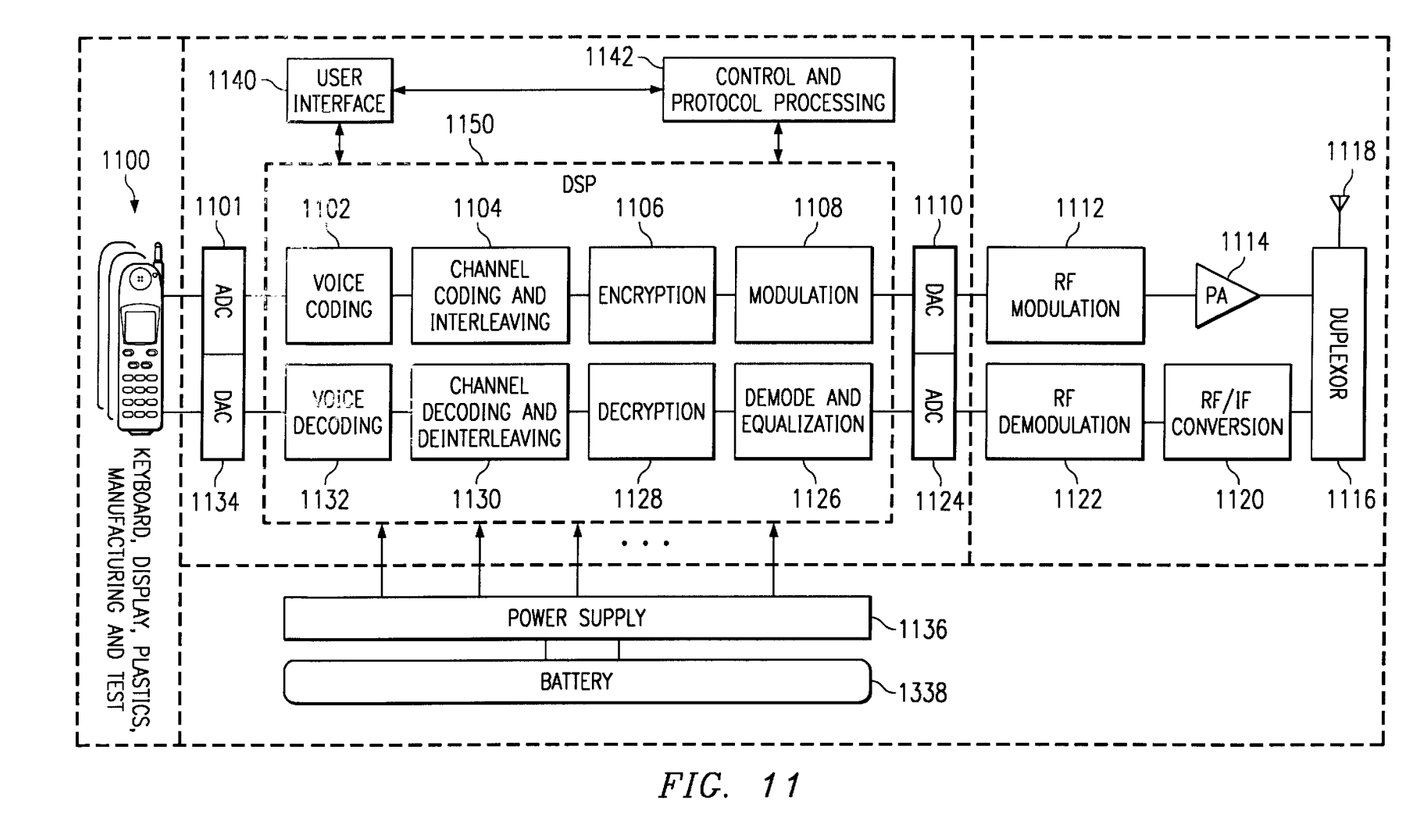
FIG. 11 shows the architecture of a typical mobile telephone.

FIG. 11 shows a block diagram of a wireless telephone 1100. In the transmission mode, after a user has dialed out and made the initial connection, the user speaks into the receiver where analog-to-digital circuitry 1101 digitizes the analog voice signal and presents it to the voice encoding stage 1102. The output of the voice encoding stage 1102 is processed by a channel coding and interleaving stage 1104, and then by an encryption stage 1106 which scrambles the information for transmission. Subsequent to encryption, the signal is modulated (stage 1108) and passed to the digital-to-analog circuitry 1110 in preparation for high-frequency RF modulation 1112. The resulting RF signal is amplified (stage 1114) and passed through the duplexor circuitry 1116 to the transmitting antenna 1118. In the receive mode, an RF signal is received through antenna 1118 and duplexor circuitry 1116. RF/IF conversion circuitry 1120 processes the signal and presents it to the RF demodulator 1122, from which a modulated baseband signal is sent to the analogto-digital circuitry 1124. The resulting digital signal is passed through the demodulation and equalization stage 1126 into the decryption stage 1128. The channel decoding and deinterleaving stage 1130 receives the signal and passes it to voice decoding stage 1132. At the output, the signal is converted to analog (by DAC 1134) and sent to the telephone audio speaker. Battery 1138 and power supply 1136 provide power to the circuitry. The user interface 1140 is managed by a control and protocol processing stage 1142, which can be implemented, for example, as a low-power microcontroller (possibly customized for this application). A digital signal processor chip 1150, controlled by stage 1142, preferably performs frame synchronization (and other functions) in stage 1128. (Optionally the functions of some or all or stages 1102, 1104, 1106, 1108, 1126, 1128, 1130, and 1132, and possibly also other functions, can be combined in a single integrated circuit 1150.)

According to disclosed embodiments, there is provided: A method for detection of a unique word, which is normally preceded by a synchronization pattern, in a data stream, comprising the actions of: (a.) feeding the data stream into a finite impulse response filter structure which applies a coefficient vector to derive a receiver output signal from said data stream, said coefficient vector having more than binary resolution, and being dependent on the specific value of the unique word, and lying within the space spanned by a collection of vectors $V^i$, and being near said vectors Vi; wherein each said vector $V^i$ represents the difference between said unique word and a respective candidate vector $S^i$ which is a subsequence taken from the concatenation of said unique word with said synchronization pattern; and (b.) detecting said unique word in said bit stream whenever said step (a.) produces a receiver output signal which is above a threshold.

According to disclosed embodiments, there is provided: A method for detection of a unique word in a bit stream, comprising the actions of: (a.) repeatedly testing to detect a near match between said incoming bit stream and a set of stored coefficients; wherein said stored coefficients vary in dependence on the specific value of said unique word, and are not equal to said unique word nor to any shift or multiple thereof; and (b.) detecting said unique word in said bit stream whenever said step (a.) detects a near match.

According to disclosed embodiments, there is provided: A method for receiving synchronous communication, in a format where a unique word, which is normally preceded by a synchronization pattern, marks frame boundaries in a data stream, comprising the actions of: (a.) feeding the data stream into a finite impulse response filter structure which applies a coefficient vector to derive a receiver output signal from said data stream, said coefficient vector having more than binary resolution, and being dependent on the specific value of the unique word, and lying within the space spanned by a collection of vectors $V^i$, and being near said vectors $V^i$; wherein each said vector $V^i$ represents the difference between said unique word and a respective candidate vector $S^i$ which is a subsequence taken from the concatenation of said unique word with said synchronization pattern; and (b.) detecting a frame boundary in said bit stream whenever said step (a.) produces a receiver- output signal which is above a threshold; and (c.) extracting data from said bit stream at only some offsets from the frame boundary detected in said step (b.).

According to disclosed embodiments, there is provided: A receiving method for synchronous communication, comprising the actions of: (a.) repeatedly testing to detect a near match between an incoming bit stream and a set of stored coefficients; wherein said stored coefficients vary in dependence on the specific value of a unique word which marks the timing of a frame boundary, and are not equal to said unique word nor to any bit rotation thereof; (b.) detecting a frame boundary in said bit stream whenever said step (a.) detects a near match; and (c.) extracting data from said bit stream at only some offsets from the frame boundary detected in said step (b.).

According to disclosed embodiments, there is provided: A time-domain-segmented communication system, comprising: a transmitter which transmits a bit stream which is formatted in frames of data; and a receiver which performs the actions of: (a.) repeatedly testing to detect a near match between an incoming bit stream and a set of stored coefficients; wherein said stored coefficients vary in dependence on the specific value of a unique word which marks the timing of a frame boundary, and are not equal to said unique word nor to any bit rotation thereof; (b.) detecting a frame boundary in said bit stream whenever said step (a.) detects a near match; and (c.) extracting data from said bit stream at only some offsets from the frame boundary detected in said step (b.).

According to disclosed embodiments, there is provided: A portable telephone system, comprising: a wireless receiver, and digitizing stages which provide a digital bit stream as output in dependence on signals received by said receiver; and at least one signal processing stage receiver which is connected to receive said bit stream, and which performs the actions of: (a.) repeatedly testing to detect a near match between said bit stream and a set of stored coefficients; wherein said stored coefficients vary in dependence on the specific value of a unique word which marks the timing of a frame boundary, and are not equal to said unique word nor to any bit rotation thereof; (b.) detecting a frame boundary in said bit stream whenever said step (a.) detects a near match; and (c.) extracting data from said bit stream at only some offsets from the frame boundary detected in said step (b.).

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the disclosed innovations are not limited to telephones, but can be applied to many other mobile communications architectures, such as pagers or other units with non-telephonic interfaces.

For another example, the detailed structure of the filter does not have to be identical to that shown, but can be modified in various ways. Moreover, it may also be possible to use mathematical functions other than correlation for the match detection, although this is not preferred.

For another example, it may also be possible to expand the candidate set in various other ways, e.g. by including candidate subsequences which are based on other phase shifts of the bit_sync pattern with respect to the unique word.

Moreover, the disclosed innovations are not only applicable to systems which are normally described as TDMA systems, but are also applicable to frame synchronization in any digital signal channel where frame synchronization is necessary. (At least where a unique word of some sort is used for frame synchronization.)

In system applications, this innovation is expected to be particularly advantageous where a single receiver may need to interface to multiple transmitters. Where the unique word for frame synchronization is always the same, as for example in T1 high-speed digital telephony, the unique word used for frame synchronization is permanently fixed, and T1 receivers can therefore be fully optimized for the sole purpose of T1 frame synchronization with this particular unique word. By contrast, in a mobile telephone system with cellular transmitters, a receiver will frequently need to be handed off from one transmitter station to another.

The presently preferred embodiment uses phase shift keying, but the disclosed inventions can be applied to other modulation or keying methods.

Of course, a wide variety of TDMA architectures can be used, and the present invention is applicable to any of those.

The filter structure of FIG. 1 can be implemented in hardware, in software, or using combination of the two.

What is claimed is:

1. A method for detection of a unique word, which is normally preceded by a synchronization pattern, in a data stream, comprising the actions of:

(a.) feeding the data stream into a finite impulse response filter structure which applies a coefficient vector to derive a receiver output signal from said data stream, said coefficient vector having more than binary resolution, and being dependent on the specific value of the unique word, and lying within the space spanned by a collection of vectors $V^i$, and being near said vectors $V^i$;

wherein each said vector $V^i$ represents the difference between said unique word and a respective candidate vector $S^i$ which is a subsequence taken from the concatenation of said unique word with said synchronization pattern; and (b.) detecting said unique word in said bit stream whenever said step (a.) produces a receiver output signal which is above a threshold.

2. The method of claim 1, wherein said unique word is also optimized, in combination with said coefficient vector, for optimal performance of said detecting step (b.).

3. The method of claim 1, wherein elements of said coefficient vector each have at least 4 bits of resolution.

4. The method of claim 1, wherein said coefficient vector is derived from less than two-thirds of the set of all possible vectors $V^i$.

5. A method for detection of a unique word in a bit stream, comprising the actions of:

(a.) repeatedly testing to detect a near match between said incoming bit stream and a set of stored coefficients; wherein said stored coefficients vary in dependence on the specific value of said unique word, and are not equal to said unique word nor to any shift or multiple thereof; and (b.) detecting said unique word in said bit stream whenever said step (a.) detects a near match.

6. The method of claim 5, wherein said stored coefficients are also dependent on a pattern of symbol synchronization bits which predictably precede said unique word with an unknown phase offset interposed there between.

7. The method of claim 5, wherein said testing step is a correlation operation.

8. The method of claim 5, wherein said testing step uses a filter structure with a non-binary coefficient vector $X_{opt}$ which is optimized according to the formula $$X_{opt} = \max_{\underline{X}} \min_i \langle \underline{U} - \underline{S}^i, X \rangle$$

where U is the unique word, and $S^i$ are subsequences which are extracted from the concatenation of said unique word with at least part of a bit synchronization pattern which normally precedes said unique word.

9. The method of claim 8, wherein said subsequences $S^i$ each have the same length as said unique word.

10. A method for receiving synchronous communication, in a format where a unique word, which is normally preceded by a synchronization pattern, marks frame boundaries in a data stream, comprising the actions of:

(a.) feeding the data stream into a finite impulse response filter structure which applies a coefficient vector to derive a receiver output signal from said data stream, said coefficient vector having more than binary resolution, and being dependent on the specific value: of the unique word, and lying within the space spanned by a collection of vectors $V^i$, and being near said vectors $V^i$;

wherein each said vector $V^i$ represents the difference between said unique word and a respective candidate vector $S^i$ which is a subsequence taken from the concatenation of said unique word with said synchronization pattern; and (b.) detecting a frame boundary in said: bit stream whenever said step (a.) produces a receiver output signal which is above a threshold; and (c.) extracting data from said bit stream at only some offsets from the frame boundary detected in said step (b.).

11. The method of claim 10, wherein said unique word is also optimized, in combination with said coefficient vector, for optimal performance of said detecting step (b.).

12. The method of claim 10, wherein elements of said coefficient vector each have at least 4 bits of resolution.

13. The method of claim 10, wherein said coefficient vector is derived from less than two-thirds of the set of all possible vectors $V^i$.

14. A receiving method for synchronous communication, comprising the actions of:

(a.) repeatedly testing to detect a near match between an incoming bit stream and a set of stored coefficients; wherein said stored coefficients vary in dependence on the specific value of a unique word which marks the timing of a frame boundary, and are not equal to said unique word nor to any bit rotation thereof;

(b.) detecting a frame boundary in said bit stream whenever said step (a.) detects a near match; and (c.) extracting data from said bit stream at only some offsets from the frame boundary detected in said step (b.).

15. The method of claim 14, wherein said stored coefficients are also dependent on a pattern of symbol synchronization bits which predictably precede said unique word .with an unknown phase offset interposed there between.

16. The method of claim 14, wherein said testing step is a correlation operation.

17. The method of claim 14, wherein said testing step uses a filter structure with a non-binary coefficient vector $X_{opt}$ which is optimized according to the formula $$X_{opt} = \max_{\underline{X}} \min_{i} \langle \underline{U} - \underline{S}^i, \underline{X} \rangle$$

where U is the unique word, and $S^i$ are subsequences which are extracted from the concatenation of said unique word with at least part of a bit synchronization pattern which normally precedes said unique word.

18. The method of claim 17, wherein said subsequences $S^i$ each have the same length as said unique word.

19. A time-domain-segmented communication system, comprising:
   a transmitter which transmits a bit stream which is formatted in frames of data; and
   a receiver which performs the actions of:
      (a.) repeatedly testing to detect a near match between an incoming bit stream and a set of stored coefficients; wherein said stored coefficients vary in dependence on the specific value of a unique word which marks the timing of a frame boundary, and are not equal to said unique word nor to any bit rotation thereof;
      (b.) detecting a frame boundary in said bit stream whenever said step (a.) detects a near match; and
      (c.) extracting data from said bit stream at only some offsets from the frame boundary detected in said step (b.).

20. The system of claim 19, wherein said stored coefficients are also dependent on the pattern of symbol synchronization bits which predictably precede said unique word with an unknown phase offset interposed there between.

21. The system of claim 19, wherein said testing step is a correlation operation.

22. The system of claim 19, wherein said testing step uses a filter structure with a non-binary coefficient vector $X_{opt}$ which is optimized according to the formula $$X_{opt} = \max_{\underline{X}} \min_{i} \langle \underline{U} - \underline{S}^i, \underline{X} \rangle$$

where U is the unique word, and $S^i$ are subsequences which are extracted from the concatenation of said unique word with at least part of a bit synchronization pattern which normally precedes said unique word.

23. The system of claim 22, wherein said subsequences $S^i$ each have the same length as said unique word.

24. A portable telephone system, comprising:
   a wireless receiver, and digitizing stages which provide a digital bit stream as output in dependence on signals received by said receiver; and
   at least one signal processing stage receiver which is connected to receive said bit stream, and which performs the actions of:
      (a.) repeatedly testing to detect a near match between said bit stream and a set of stored coefficients; wherein said stored coefficients vary in dependence on the specific value of a unique word which marks the timing of a frame boundary, and are not equal to said unique word nor to any bit rotation thereof;
      (b.) detecting a frame boundary in said bit stream whenever said step (a.) detects a near match; and
      (c.) extracting data from said bit stream at only some offsets from the frame boundary detected in said step (b.).

25. The system of claim 24, further comprising a microphone and a speaker.

26. The system of claim 24, wherein said stored coefficients are also dependent on a pattern of symbol synchronization bits which predictably precede said unique word with an unknown phase offset interposed there between.

27. The system of claim 24, wherein said testing step is a correlation operation.

28. The system of claim 24, wherein said testing step uses a filter structure with a non-binary coefficient vector $X_{opt}$ which is optimized according to the formula $$X_{opt} = \max_{\underline{X}} \min_{i} \langle \underline{U} - \underline{S}^i, \underline{X} \rangle$$

where U is the unique word, and $S^i$ are subsequences which are extracted from the concatenation of said unique word with at least part of a bit synchronization pattern which normally precedes said unique word.

29. The system of claim 28, wherein said subsequences $S^i$ each have the same length as said unique word.

* * * * *